US006911984B2

(12) United States Patent
Sabella et al.

(10) Patent No.: US 6,911,984 B2
(45) Date of Patent: Jun. 28, 2005

(54) DESKTOP COMPOSITOR USING COPY-ON-WRITE SEMANTICS

(75) Inventors: Paolo E. Sabella, Dublin, CA (US); Nicholas P. Wilt, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 138 days.

(21) Appl. No.: 10/388,267

(22) Filed: Mar. 12, 2003

(65) Prior Publication Data

US 2004/0179018 A1 Sep. 16, 2004

(51) Int. Cl.[7] ................................................ G06F 13/00

(52) U.S. Cl. ....................... 345/536; 345/503; 345/520; 345/531; 345/545; 345/539

(58) Field of Search ................................ 345/503, 519, 345/520, 531, 536, 539, 543, 545, 559, 562

(56) References Cited

U.S. PATENT DOCUMENTS

| | | | | | |
|---|---|---|---|---|---|
| 5,742,788 | A | | 4/1998 | Priem et al. | |
| 5,801,717 | A | * | 9/1998 | Engstrom et al. | 345/539 |
| 5,844,569 | A | * | 12/1998 | Eisler et al. | 345/619 |
| 6,075,543 | A | * | 6/2000 | Akeley | 345/539 |
| 6,396,473 | B1 | * | 5/2002 | Callahan et al. | 345/530 |
| 6,538,650 | B1 | * | 3/2003 | Prasoonkumar et al. | 345/419 |
| 6,587,112 | B1 | * | 7/2003 | Goeltzenleuchter et al. | 345/532 |
| 6,697,063 | B1 | * | 2/2004 | Zhu | 345/421 |
| 2002/0085013 | A1 | * | 7/2002 | Lippincott | 345/572 |
| 2003/0058221 | A1 | * | 3/2003 | Tucker et al. | 345/163 |
| 2003/0071818 | A1 | * | 4/2003 | Wilt et al. | 345/537 |

OTHER PUBLICATIONS

Tanenbaum, Andrew S., *Modern Operating Systems*, 2nd Ed., Prentice Hall, New Jersey, 2001, 5 pages.

* cited by examiner

*Primary Examiner*—Ulka J. Chauhan
(74) *Attorney, Agent, or Firm*—Townsend and Townsend and Crew, LLP

(57) ABSTRACT

Tile data for drawing and desktop buffers in a desktop compositor system is managed using "copy-on-write" semantics, in which tile data stored in a memory location is not transferred to another location until the tile data for one of the buffers is modified. For each tile in drawing buffers and desktop buffers, an association is maintained with a location in a tile memory, and the number of buffer tiles associated with each location is tracked. To copy a tile from one buffer to another, the tile association for the tile in the destination buffer is modified. New data for a tile of a buffer is written to the tile memory location associated with the buffer after ensuring that the tile memory location is not associated with any other tiles of any of the buffers. As a result, memory bandwidth can be considerably reduced.

33 Claims, 6 Drawing Sheets

DESKTOP COMPOSITOR USING COPY-ON-WRITE SEMANTICS

CROSS-REFERENCES TO RELATED APPLICATIONS

The present disclosure is related to co-pending U.S. patent application Ser. No. 10/388,112, filed on the same date as the present application, entitled "Double-Buffering of Image Data Using Copy-on-Write Semantics," which disclosure is incorporated herein by reference for all purposes.

BACKGROUND OF THE INVENTION

The present invention relates in general to generation of image data in computer systems and in particular to a desktop compositor using copy-on-write semantics.

Computer display devices typically display images by coloring each of a number of independent pixels (picture elements) that cover the display area. The computer system determines a color value for each pixel using various well-known graphics processing techniques. Once color values are generated, pixel data representing the color values is written to a "frame buffer," an area of memory with sufficient capacity to store color data for each pixel of the display device. To display an image, scanout control logic reads the pixel values sequentially from the frame buffer and converts them to analog signals that produce the desired pixel colors on the display device. Scanout is generally performed at a constant frame rate, e.g., 80 Hz.

The demand for access to the frame buffer memory can be quite large. For instance, scanout at 80 Hz for a 1024×768 pixel display with 32-bit color requires the capacity to read 2 Gbits per second. At the same time, data for the next frame is also being written to the frame buffer, often at high rates. Thus, memory bandwidth is generally a scarce resource in image generation systems.

To improve memory access times and to prevent undesirable visual artifacts that can result if data in the frame buffer is updated during scanout of a frame, many image generation systems provide a double-buffered frame buffer. In these systems, the frame buffer includes two memory spaces, each of which has sufficient capacity to store pixel data for a complete display frame. At a given time, one memory space is designated as the "back" buffer while the other is designated as the "front" buffer. Applications write pixel data to the back buffer while the front buffer is scanned out for display. The two memory spaces are generally designed to be accessed in parallel, to reduce conflicts between updating and scanout operations. At the end of each scanout frame, the buffers are swapped, i.e., the memory space designated as the front buffer becomes the back buffer and vice versa. The next frame is written to the new back buffer while the new front buffer is scanned out.

To avoid writing an entire frame to the back buffer, some existing systems also copy the content of the back buffer to the front buffer at the time of swapping, so that the back buffer can be updated during the next frame, rather than being completely rewritten. This procedure can reduce demand for write access during the frame interval, but the peak demand for memory bandwidth can be quite high due to the need to copy an entire frame of pixel data at the end of each frame.

To increase control over the appearance of the desktop and to provide better management of memory bandwidth, an image generation system with a "desktop compositor" has been proposed. In a desktop compositor system, each application writes its pixel data to a dedicated drawing memory area that is not scanned out. A desktop compositor then selects one or more of the drawing memory areas to provide the pixel data to be displayed for a given pixel (or group of pixels, referred to as a tile) and writes appropriate pixel data to the desktop frame buffer.

FIG. 1 illustrates the pixel buffers and data transfers required for one implementation of a desktop compositor. Each application 102 (104) has a pair of drawing buffers 106, 108 (110, 112). Application 102 (104) writes pixel data to its "back" drawing buffer 106 (110). In parallel, a desktop compositor 114 reads pixel data from the front drawing buffers 108 (112) of one or more of the applications, performs any desired manipulations and writes or copies pixel data to a "back" desktop (frame) buffer 116. In parallel with operation of the desktop compositor, scanout control logic 118 scans out a "front" desktop buffer 120 for displaying on a display device (not shown). Periodically (e.g., at the end of each frame), the back and front buffers of each pair are swapped—i.e., the buffer that was used as the back buffer becomes the front buffer and vice versa. After swapping, the new front desktop buffer 116 is typically copied to the new back desktop buffer 120 so that the next frame can be generated by incremental updating of the pixel data. The new front drawing buffer 106 for an application can also be copied to the corresponding new back drawing buffer 108; this is generally done where the application performs incremental updating of its drawing buffer. For applications that redraw their entire drawing buffers during each frame, copying data between the application's two drawing buffers is unnecessary.

Such systems generally require pixel data to be transferred several times. For instance, data may be written to a back drawing buffer, copied to a front drawing buffer, read by the desktop compositor, written to the back desktop buffer, and copied from the back desktop buffer to the front desktop buffer. These transfers occur regardless of whether the data has changed or not. The memory bandwidth required to perform these transfers can be considerable, resulting in degradation of system performance.

It is therefore desirable to provide a system that reduces the need for transferring pixel data from one buffer to another.

BRIEF SUMMARY OF THE INVENTION

Embodiments of the present invention provide memory management systems and methods for tile data in a desktop compositor system using "copy-on-write" semantics. An arbitrary number of the drawing and/or desktop buffers can be associated with a single location in tile memory. Tile data for a particular tile is not transferred from one location in memory to another until the tile data for one of the buffers associated with that location needs to be modified. As a result, memory bandwidth can be considerably reduced.

According to one aspect of the invention, system for managing tile data for tiles of a display comprises a memory space, buffers, counters, and a memory interface circuit. The memory space is configured to store tile data in a number of tile memory locations. Each of the buffers has a number of buffer tiles, and each buffer tile stores a reference associating the buffer tile with one of the tile memory locations. Each of the counters is associated with a respective one of the tile memory locations and is configured to store a value representing the number of buffer tiles that are associated with the respective one of the tile memory locations. The memory interface circuit is configured to receive a memory access command referencing a buffer tile of one of the buffers and to respond to the memory access command by accessing the tile memory location associated with the buffer tile. The memory interface circuit uses the references stored in the buffer tiles in order to determine and modify associations of the buffer tiles with the tile memory locations.

According to another aspect of the invention, a method for managing data for tiles of a display is provided. The method uses a number of buffers, each of which includes buffer tiles, with each buffer tile being associated with one of a plurality of tile memory locations in a tile memory space. The tile memory space is accessed by referencing one of the buffer tiles. For each of the tile memory locations, a reference count is maintained of the buffer tiles associated with the tile memory location. A source buffer tile of a source one of the buffers is copied to a destination buffer tile of a destination one of the buffers by associating the destination buffer tile with a same tile memory location as the source buffer tile and updating the reference counts. New data for the destination buffer tile is written to the tile memory location associated with the destination buffer tile after updating the destination buffer tile such that the tile memory location associated with the destination buffer tile is not associated with any other buffer tile.

According to yet another aspect of the invention, a method for managing data for a plurality of tiles of a display is provided. The method uses a number of buffers, each of which includes buffer tiles, with each buffer tile being associated with one of a plurality of tile memory locations in a tile memory space. The tile memory space is accessed by referencing one of the buffer tiles. The buffers include a first drawing buffer, a second drawing buffer, a first desktop buffer, and a second desktop buffer. For each tile memory location, a reference count is maintained of the buffer tiles associated with the tile memory location. A first display image is scanned out by reading tile data from tile memory locations associated with buffer tiles of the first desktop buffer. In parallel with the act of scanning out a first display image, desktop tile data is generated for a tile of a second display image from source tile data stored in a tile memory location associated with a buffer tile of the first drawing buffer; and the desktop tile data is stored in a tile memory location associated with a buffer tile of the second desktop buffer. In response to completion of the act of scanning out a first display image, the second desktop buffer is copied to the first desktop buffer by associating each buffer tile of the second desktop buffer with a same tile memory location as a corresponding buffer tile of the first desktop buffer and updating the reference counts.

The following detailed description together with the accompanying drawings will provide a better understanding of the nature and advantages of the present invention.

DETAILED DESCRIPTION OF THE INVENTION

Figure 1:
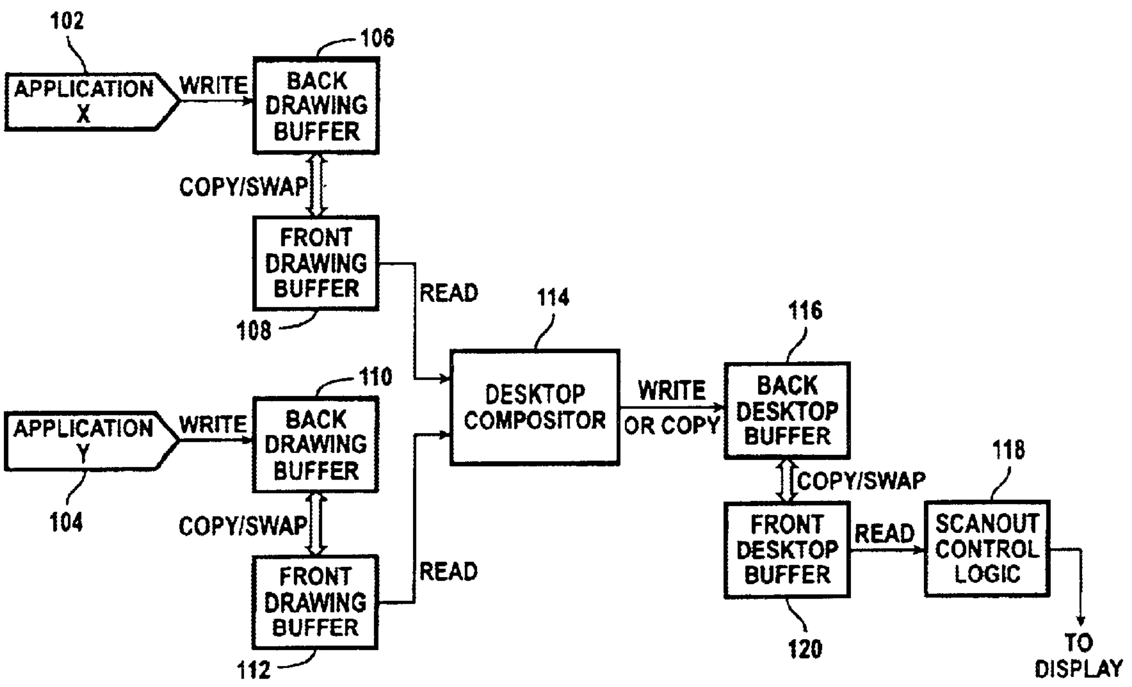
FIG. 1 is a block diagram of a proposed desktop compositor system for generating a desktop display image.

Embodiments of the present invention provide memory management systems and methods for tile data in a desktop compositor system using "copy-on-write" semantics. An arbitrary number of the drawing and/or desktop buffers can be associated with a single location in tile memory. Tile data for a particular tile is not transferred from one location in memory to another until the tile data for one of the buffers need to be modified. As a result memory bandwith can be considerably reduced. The above-referenced related application Ser. No. 10/388,112 describes additional embodiments of the memory management using copy-on-write semantics, in which two buffers can be associated with a location in the tile memory.

Figure 2:
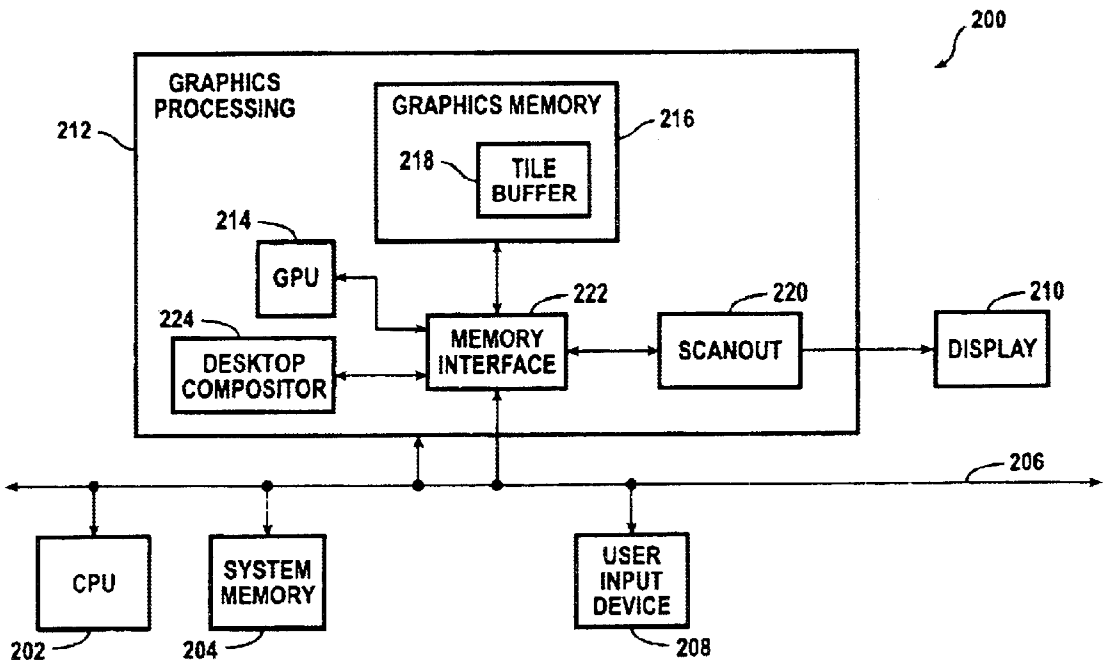
FIG. 2 is a block diagram of a computer system suitable for use with an embodiment of the present invention.

FIG. 2 is a block diagram of a computer system 200 suitable for implementing the present invention. Computer system 200 includes a central processing unit (CPU) 202 and a system memory 204 communicating via a system bus 206. User input is received from one or more user input devices 208 (e.g., keyboard, mouse) coupled to system bus 206. Visual output is provided on a display device 210 (e.g., a conventional CRT- or LCD-based monitor) operating under control of a graphics processing subsystem 212 coupled to system bus 206. Graphics processing subsystem 212 includes a graphics processing unit (GPU) 214, a graphics memory 216, scanout control logic 220, a display memory interface 222 and a desktop compositor module 224. Graphics memory 216 includes a tile memory 218 that provides space for buffering pixel data for each of a number of applications (or other pixel data sources) as well as buffering of a composite desktop image, as will be described below. Memory interface 222 provides access to pixel data stored in tile memory 218 and may also provide access to other portions of graphics memory 216. Desktop compositor module 224 generates desktop pixel data using buffered pixel data from tile memory 218 and writes the desktop pixel data to tile memory 218. Although shown as a separate block, desktop compositor module 224 may also be implemented in software or firmware executing in GPU 214 or CPU 202.

GPU 214, scanout control logic 220, and desktop compositor 224 access tile memory 218 through a display memory interface 222. Display memory interface 222 may be coupled to system bus 206 to allow communication between CPU 202 and tile memory 218; alternatively, CPU 202 may communicate with display memory interface 222 via GPU 214.

In operation, CPU 202 executes one or more application programs, which generate image data. This data is provided via the system bus to the graphics processing subsystem. Some applications may generate pixel data and provide it to tile memory 218. Other applications may generate image data in the form of geometric representations that GPU 214 converts to pixel data. Any technique for generating pixel data may be used; a number of such techniques are known in the art. Regardless of how it is generated, pixel data is stored in tile memory 218, which in accordance with the present invention is managed by memory interface 222 using copy-on-write semantics, as will be described below.

Desktop compositor 224 accesses tile memory 218 via memory interface 222 to read buffered pixel data from one or more applications and generates composite pixel data representing the desktop image to be displayed. The composite pixel data is written to tile memory 218 via memory interface 222. Memory interface 222 responds to desktop compositor 224 using copy-on-write semantics, as will be described below.

Desktop pixel data (also referred to as composite pixel data) in tile memory 218 is read out by scanout control logic 220 via memory interface 222. Scanout control logic 220 generates control signals for display device 210. In one embodiment, scanout control logic 220 reads the display buffer and refreshes the display at a constant rate (e.g., 80 Hz); the refresh rate can be a user-selectable parameter. Scanout control logic 220 may include various operations such as digital-to-analog conversion, generating composite images using the pixel data from tile memory 218 and other pixel data sources (not shown) such as a video overlay image or a cursor overlay image, and the like.

It will be appreciated that FIG. 2 is illustrative and that modifications are possible. For instance, a separate GPU is not required; all pixel data can be supplied directly from the CPU or other system components. The display device can be any pixel-based display. In view of the present disclosure, one of ordinary skill in the art will recognize that a wide variety of system configurations can be used for practicing the present invention.

In accordance with an embodiment of the present invention, tile memory 218 provides storage of pixel data for buffers including double-buffered drawing buffers and a double-buffered desktop (frame) buffer. Tile memory 218 is managed by memory interface 222 using copy-on-write semantics. For memory management purposes, the display frame is segmented into a number (N) of non-overlapping tiles, where each tile includes one or more pixels. Tiles can be of any size, and tile size can advantageously be selected based on properties of graphics memory 216, such as memory transaction size; for instance, if graphics memory 216 can transfer data for 32 pixels in parallel, a tile size of 4×8 pixels can be advantageously selected.

Figure 3:
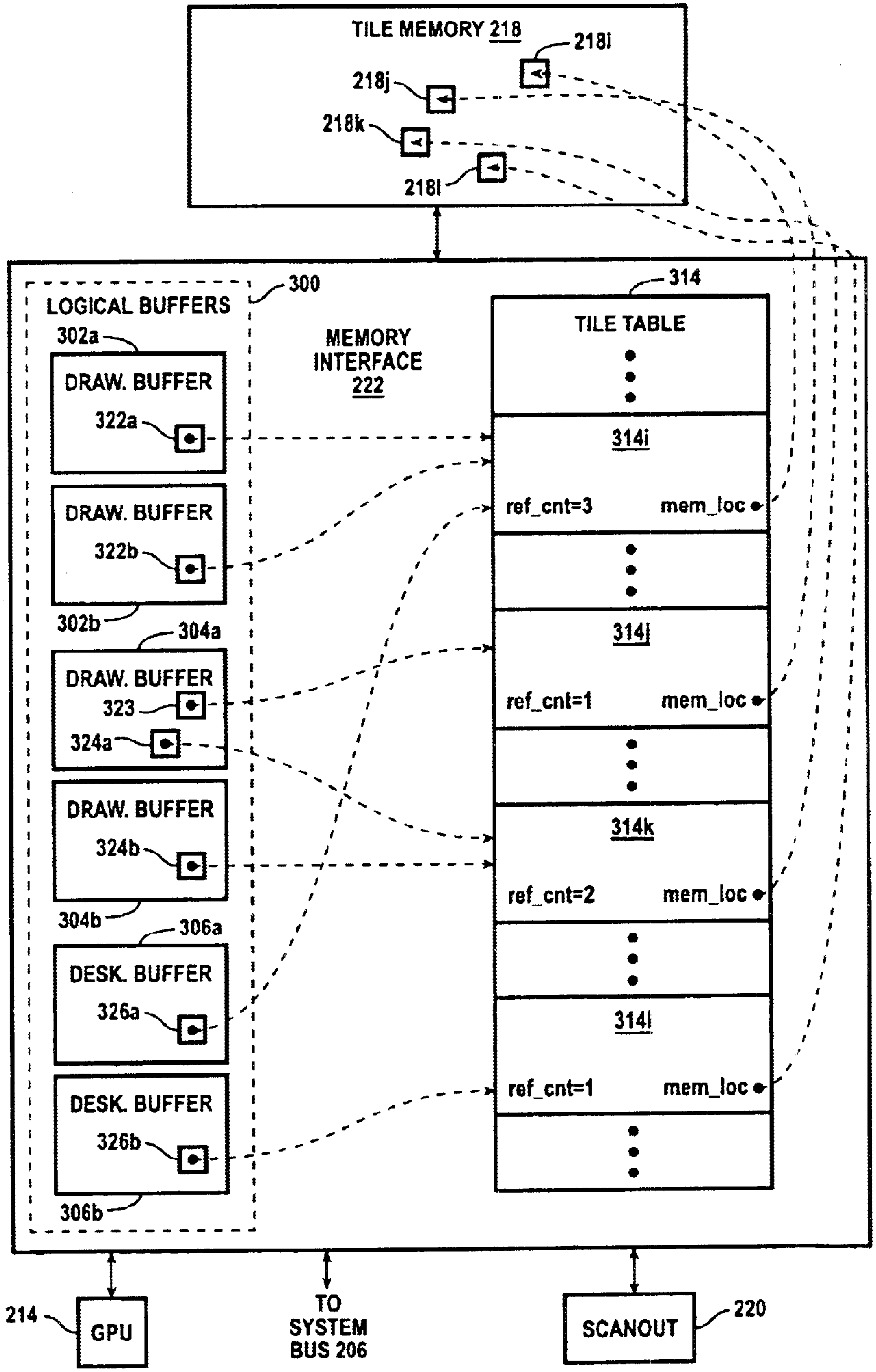
FIG. 3 is a diagram of a memory model for tile data according to an embodiment of the present invention.

FIG. 3 is a block diagram of a memory interface 222 and a tile memory 218 according to an embodiment of the present invention. Tile data for the desktop buffer and for the drawing buffer for each application is stored in tile locations (e.g., locations 218*i*, 218*j*, 218*k*, 218*l*) in tile memory 218. For a tile memory 218 of a given size, the number of tile locations (M) depends on various implementation-dependent factors, including the number of pixels in a tile, the number of tiles in the screen area, and the number of bits to be stored per pixel. For example, if tile memory 218 implemented as a 256 Mbyte video memory storing data for tiles of 16 pixels each at 32 bits per pixel, then there can be about 3.9 million tile locations.

These M tile locations can be used to support any number of application drawing buffers. For instance, in the example just given, if each drawing buffer includes 49,152 tiles (corresponding to a screen size of 1024×768 pixels), then almost 40 double-buffered drawing buffers can be supported. Alternatively, the number of tiles per drawing buffer can be limited to a smaller number to increase the number of drawing buffers that can be supported. These examples are given for purposes of illustration, and the invention is not limited to particular tile sizes or memory configurations.

Tile locations in tile memory 218 are not dedicated to any particular one of the drawing or desktop buffers. Instead, memory interface 222 dynamically associates tile locations with tiles ("buffer tiles") in one or more of a set of logical buffers 300. Logical buffers 300 include a pair of drawing buffers 302*a*, 302*b* associated with a first application, a pair of drawing buffers 304*a*, 304*b* associated with a second application, and a pair of desktop (frame) buffers 306*a*, 306*b* associated with the composite desktop image. Although drawing buffers for only two applications are shown, it is to be understood that similar drawing buffers can be supplied for any desired number K of applications.

The logical buffers 300 do not store tile data. Instead, each buffer stores an association between each of its tiles and one of the tile locations in tile memory 218. The association for a buffer tile can be modified to refer to a different tile location. When memory interface 222 receives a memory access command referencing one of the buffers 300, memory interface 222 uses the appropriate buffer (e.g., drawing buffer 302*a*) to identify the tile location to be accessed (e.g., tile location 218*i*), then executes the command by accessing the appropriate tile location.

From the perspective of the applications, the desktop compositor, and the scanout control logic, the existence of the tile associations is transparent. For example, an application can write data for a tile by issuing a write command that references a logical drawing buffer 302*a* (or 302*b*). The desktop compositor can read application data for a tile by issuing a read command that references a logical drawing buffer 302*b* (or 302*a*) and can write desktop tile data by issuing a write command that references logical desktop buffer 306*a* (or 306*b*). The scanout control logic can read desktop data by issuing a read command that references logical desktop buffer 306*b* (or 306*a*). Memory interface 222 processes these commands using the tile associations, as will be described below.

In one embodiment, the association of tiles in logical buffers 300 with locations in tile memory 218 is provided using a tile table 314. Tile table 314 includes up to M entries (where M is the number of tile locations in tile memory 218). Each tile table entry (e.g., entry 314*i*) includes a reference (mem_loc) to a tile location in tile memory 218 and a reference counter (ref_cnt) that reflects the number of logical buffers 300 that are associated with that tile table entry. For each of its tiles, each logical buffer 300 stores a reference to a tile table entry, and multiple logical buffers 300 can store references to the same tile table entry. A buffer tile that references a particular tile table entry is associated with the tile location (mem_loc) referenced by the tile table entry. The counter (ref_cnt) is used to track the number of buffer tiles associated with the tile location and to determine whether the tile location can be overwritten with new data, as will be described below.

The dashed arrows in FIG. 3 illustrate various examples of associations of tiles in logical buffers 300 with entries in tile table 314 and tile locations in tile memory 218 for four tile table entries 314*i*, 314*j*. 314*k*, 314*l*. Each tile table entry is associated with a distinct tile location 218*i*, 218*j*, 218*k*, 218*l*. Tile table entry 314*i* is associated with tiles 322*a*, 322*b* of drawing buffers 302*a* and 302*b*, respectively, as well as a tile 326*a* of desktop buffer 306*a*. Accordingly, tile table entry 314*i* has a reference count value of 3. Tile table entry 314*j* is associated with a tile 323 of drawing buffer 304*a* and has a reference count value of 1. Tile table entry 314*k* is associated with tiles 324*a*, 324*b* of drawing buffers 304*a* and 304*b*, respectively, and has a reference count value of 2. Tile table entry 314*l* is associated with a tile 326*b* of desktop buffer 306*b* and has a reference count value of 1. These associations are merely examples of possible associations, and no particular number or combination of associations is required for any tile location or tile table entry. In addition, as will be described below, the associations can change as tile data is updated.

It should be noted that associations between tile table entries and tiles of logical buffers 300 are determined on a tile-by-tile basis. At a given time, a tile table entry can be associated with tiles of one or both drawing buffers of a pair (e.g., drawing buffers 302*a*, 302*b*) and/or with one or both desktop buffers 306*a*, 306*b*, and associations between tile table entries and buffer tiles can be created and updated independently for each tile of each buffer, as will be described below.

It will be appreciated that the memory configuration described herein is illustrative and that modifications are possible. Tile memory 218 can be implemented using one or more video memory devices or other memory technologies. Tile memory 218 is not required to be implemented as a single contiguous area of memory. The location, configuration, and size of tile memory 218 can be selected based on efficiency, space requirements, or other design considerations. The number N of tiles can be varied as desired; a tile can be as small as one pixel or as large as desired.

The logical buffers and tile table are also illustrative. Where the memory interface is implemented in an integrated circuit or chip, the logical buffers and/or the tile table can be implemented on the same chip, e.g., using one or more register arrays. The logical buffers and/or the tile table can also be implemented in a portion of a memory device that also contains the tile memory or in a different memory device. Moreover, use of particular hardware structures is not required.

The associations between buffer tiles and tile memory locations can be provided by any technique that unambiguously associates each logical buffer with a tile location on a tile-by-tile basis and maintains information about whether multiple logical buffers are associated with a given tile location. For example, if the tile table has M entries and there are M tile locations in tile memory 218, each tile table entry can be permanently associated with a corresponding tile location. In this embodiment, the tile table is not required to store a reference to the tile memory location. Instead, the logical buffers can store an offset value (e.g., an integer from 0 to M−1) for each tile. This offset value can be used to identify the tile memory location associated with the tile of the logical buffer and also to identify the corresponding tile table entry (i.e., counter).

In one embodiment of the present invention, memory interface 222 uses logical buffers 300 and tile table 314 to manage tile memory 218 using "copy-on-write" semantics. The term "copy-on-write" denotes that copying of the data generally occurs only when the tile data is actually modified. A command to copy data for a tile of a source buffer (e.g., drawing buffer 302*b*) to a target buffer (e.g., desktop buffer 306*a*) is executed by modifying the association of the target buffer tile without transferring any tile data from one memory location to another. A command to write data for a tile to a target buffer (e.g., buffer 302*a*) is executed by first ensuring that the title location associated with the tile of the target buffer is not associated with any other buffers—which may require transferring tile data from one memory location to another—and then writing the new tile data. A command to read data for a tile from a source buffer (e.g., drawing buffer 302*b*) is executed by identifying the tile location associated with the source buffer and reading data from that location.

Figure 4:
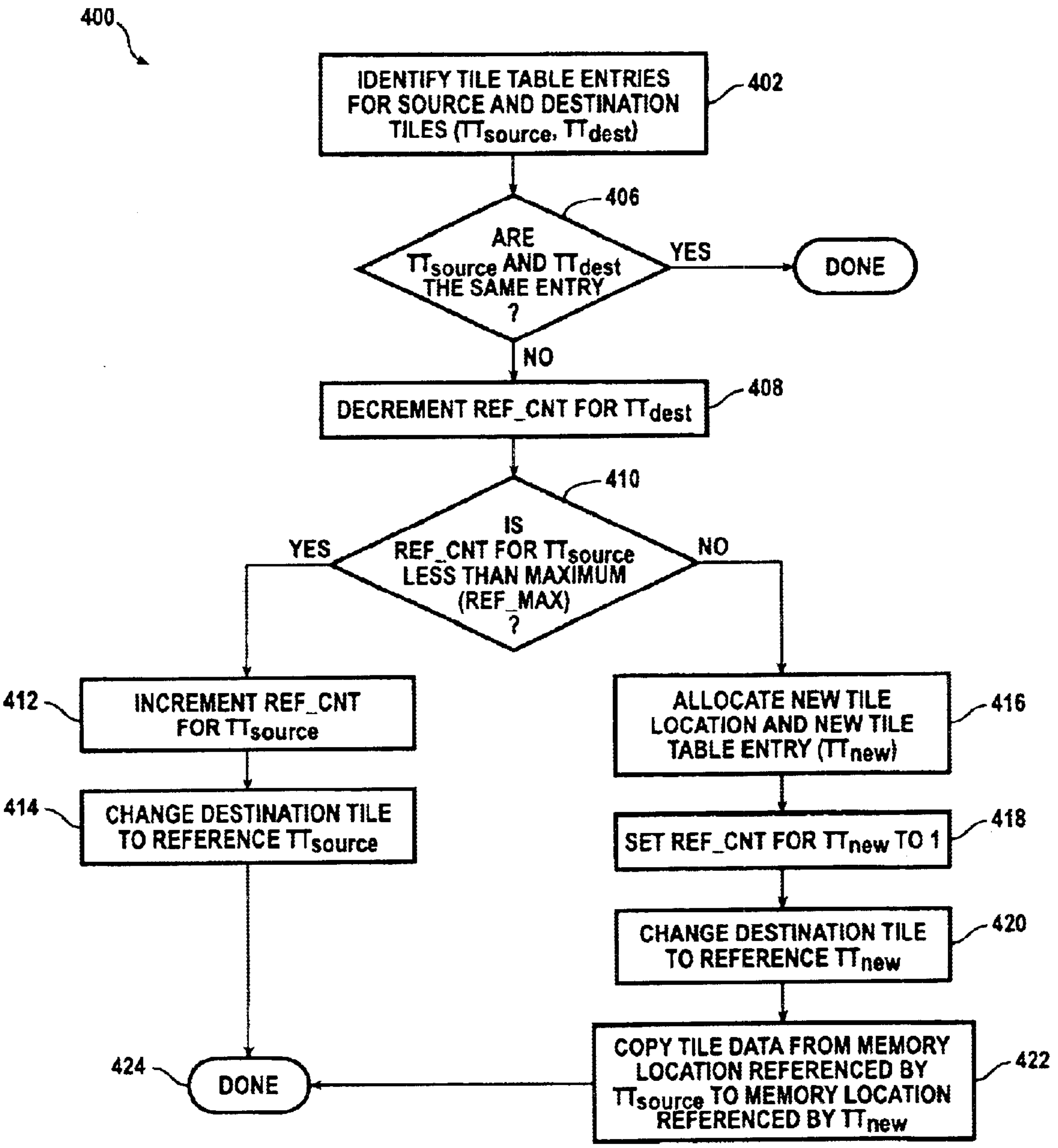
FIG. 4 is a flow chart of a process for copying tile data from a source buffer to a target buffer according to an embodiment of the present invention.

Examples of specific processes used by memory interface 222 to execute copy and write commands in accordance with an embodiment of the invention will now be described with reference to FIGS. 4 and 5. FIG. 4 illustrates a process 400 for copying a tile i of a source buffer A (denoted A[i]) to a tile j of a destination buffer B (denoted B[i]). In this process, destination buffer B is changed so that buffer tile B[j] refers to the same tile table entry as source buffer tile A[i]. The reference counts for the tile table entries are also updated to reflect the change: the count for the tile table entry that destination buffer tile B[j] referenced before the change is decremented to reflect that buffer tile B[j] is no longer associated with that memory location, and the count for the tile table entry that source buffer tile A[i] references is incremented to reflect that buffer tile B[j] is now also associated with that memory location.

More specifically, at step 402, the tile table entries TTsource associated with source buffer tile A[i] and TTdest associated with destination buffer tile B[j] are identified. This step can include ensuring that the source and destination buffer tiles each reference a valid tile table entry. At step 406, it is determined whether TTsource and TTdest are the same tile table entry. If so, then no further action is required. If not, then destination buffer tile B[j] and the associated tile table entries are updated. More specifically, at step 408, the reference count (denoted TTdest.ref_cnt) for the tile table entry associated with the destination buffer tile B[j] is decremented. At step 410, it is determined whether the reference count (TTsource.ref_cnt) for the tile table entry associated with the source tile is less than a pre-established maximum value (ref_max). If so, then the reference count for the source tile table entry TTsource.ref_cnt is incremented at step 412, and B[j] is set equal to A[i] at step 414. At this point, destination buffer tile B[j] is associated with the same title location as source buffer tile A[i], and at step 424, process 400 is done. In some implementations, a "done" message may be sent to the source of the copy command.

If, at step 410, the reference count TTsource.ref_cnt is not less than (i.e., is equal to) the maximum value, then incrementing the reference count at step 412 may lead to undesirable effects, such as a register overflow. Accordingly, rather than incrementing the reference count, at step 416, a tile location in the tile memory and a corresponding tile table entry (denoted TTnew) are allocated. Allocating a tile location involves identifying a tile location in the tile memory that is not associated with any tiles of any buffers, and allocating a tile table entry involves identifying or creating a tile table entry that contains a reference to the newly allocated tile location. Examples of techniques for allocating tile locations and tile table entries will be described below. At step 418, the reference counter TTnew.ref_cnt for the new tile table entry is set to 1. At step 420, buffer tile B[j] is updated such that B[j] references the new tile table entry TTnew. At step 422, tile data is copied from the tile location associated with source buffer tile A[i] (i.e., TTsource.mem_loc) to the tile memory location now associated with destination buffer tile B[j] (i.e., TTdest.mem_loc, which is the same as TTnew.mem_loc). At step 424, process 400 is done.

In some embodiments, the maximum value ref_max of the reference count can be made sufficiently large that the "Yes" branch at step 410 is never taken (i.e., steps 416, 418, 422, 422 need not be implemented). For example, in one embodiment, a given tile location may be associated with, at most, both of the drawing buffers of one application (e.g., 302*a*, 302*b*) and both of the desktop buffers (306*a*, 306*b*). In this embodiment, a tile table entry is never referenced by more than 4 buffers; a 3-bit reference counter (ref_max=7) is sufficient to ensure that the "Yes" branch at step 410 is never taken. In this embodiment, process 400 never requires copying tile data.

It is to be understood that process 400 is generally applicable to copying any tile of one logical buffer to any tile of any other logical buffer and can be used to respond to any command to copy a tile or an entire buffer. For instance, process 400 can be used at an end-of-frame to copy one of the desktop buffers to the other (e.g., from desktop buffer 306*a* to desktop buffer 306*b*) or to copy data between an application's two drawing buffers. Process 400 can also be used by the desktop compositor to copy a source tile (e.g., tile i of drawing buffer 302*a*) to a tile of the desktop (e.g., tile j of desktop buffer 306*b*). Thus, all copying for a desktop compositor system can be done without transferring any tile data.

Figure 5:
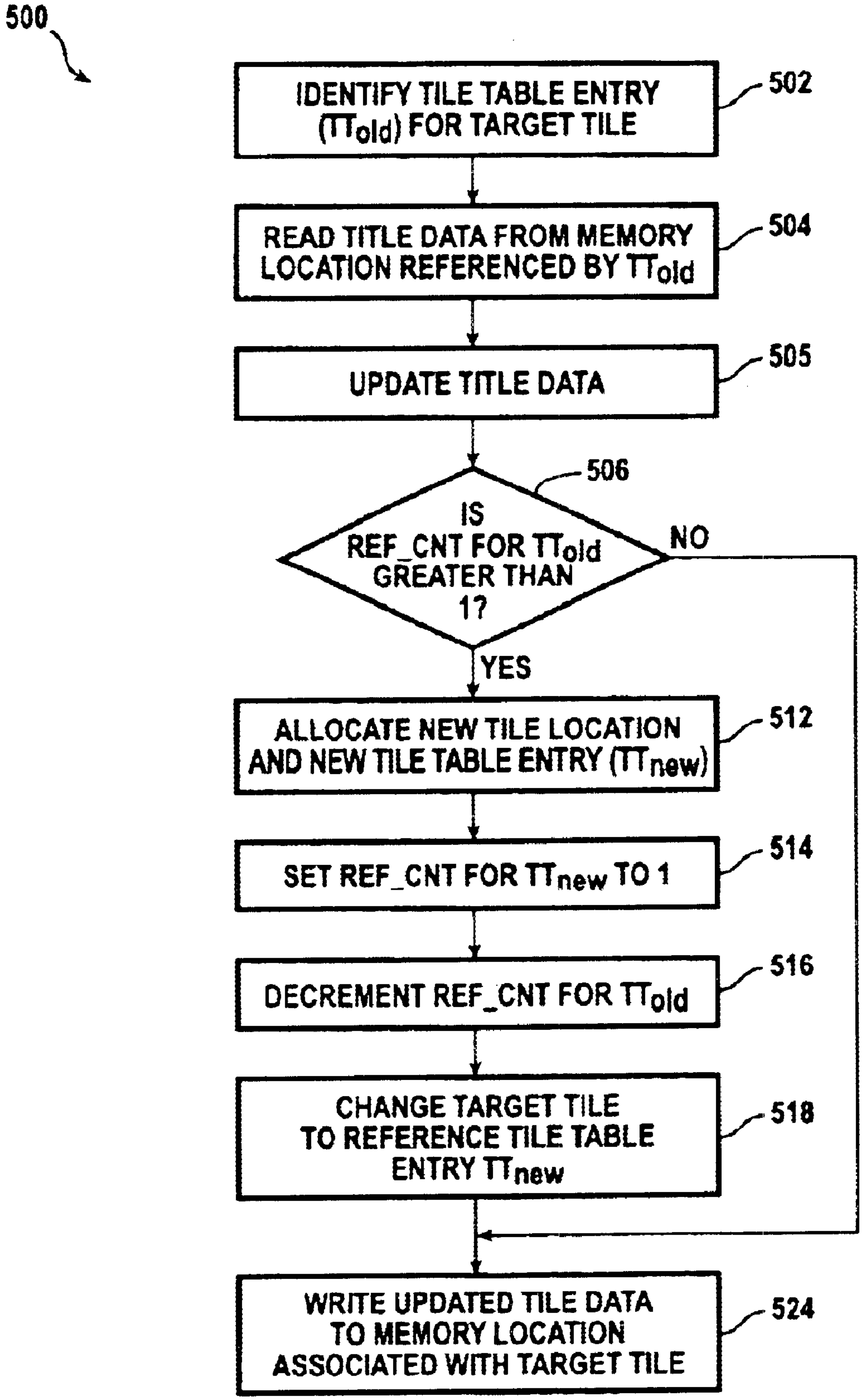
FIG. 5 is a flow chart of a process for writing tile data to a target buffer according to an embodiment of the present invention.

FIG. 5 illustrates a process 500 for writing tile data to a tile i of a target buffer A. In this process, if the tile memory location associated with the target buffer tile (denoted A[i]) is also used by one or more other buffers, buffer tile A[i] is modified to be associated with a tile memory location that is not associated with any other buffers before new or updated tile data is written. This prevents write operations directed to one buffer from affecting the tile data for another buffer.

More specifically, at step 502, the tile table entry (TTold) referenced by the target tile A[i] is identified. This step can include ensuring that the target tile A[i] references a valid tile table entry. At step 504, the tile data from the memory location associated with the target tile (TTold.mem_loc), is read, e.g., into an on-chip register of the memory interface. At step 505, the tile data in the on-chip register is updated. At step 506, it is determined whether the reference count TTold.ref_cnt for that tile table entry is equal to 1 or greater than 1. A reference count equal to 1 indicates that no other buffers are associated with tile table entry TTold, and the process proceeds with writing the new tile data to the memory location associated with the target tile (i.e., TTold.mem_loc) at step 524.

A reference count greater than 1 indicates that at least one other buffer is associated with that tile table entry and target buffer tile A[i] is to be redirected to a unique tile table entry before writing new tile data. Accordingly, at step 512, an unused tile memory location and a corresponding tile table entry (TTnew) are allocated. Various techniques for allocating tile memory locations and tile table entries will be described below. At step 514, the reference count TTnew.ref_cnt for the new tile table entry is set to 1. At step 516, the reference count TTold.ref_cnt for the tile table entry associated with target buffer tile A[i] is decremented. At step 518, target buffer tile A[i] is updated to reference tile table entry TTnew. At step 524, the updated tile data is written to the new tile location associated with target buffer tile A[i] (i.e., TTnew.mem_loc).

In an alternative embodiment, rather than reading and updating tile data, new tile data for some or all of the pixels in the tile is stored directly to memory. In this embodiment, steps 504 and 505 are omitted, and step 518 includes copying the tile data from the old tile location TTold.mem_loc to the new tile location TTnew.mem_loc. Copying all of the tile data prior to writing new data at step 524 preserves the original content of the tile so that the new data to be written can include data for fewer than all of the pixels in the tile.

It will be appreciated that processes 400 and 500 are illustrative and that modifications and variations are possible. For instance, in some embodiments, at steps 402 and 502, initialization of any buffer tile that does not reference a valid tile table entry can be performed. As another example, in some embodiments of process 400, there are no unacceptable consequences associated with performing the tile-table updating steps (e.g., steps 408, 412, 414) in the case where the source and destination buffers reference the same tile table entry at the outset; in such cases, determining whether the two buffers already reference the same tile table entry (step 406) can be omitted.

Processes 400 and 500 can be implemented within the graphics memory interface, transparent to applications, the desktop compositor, the scanout control logic, or any other source of memory access commands. For instance, the graphics memory interface can provide an application with a reference to one of the logical buffers (e.g., buffer 302*a*) to be used as a "back" drawing buffer for writing tile data. The application can issue conventional write commands targeting the back drawing buffer; the graphics memory interface executes the write command according to process 500 and returns any appropriate signals to the application. Thus, conventional applications (or any application compatible with conventional graphics memory systems) and conventional techniques for generating pixel data can be used with the present invention.

Likewise, the graphics memory interface can provide the desktop compositor with a reference to one of the logical buffers (e.g., buffer 306*a*) to be used as a "back" desktop buffer (e.g., buffer 306*a*) for writing composite tile data, as well as references to one or more other logical buffers (e.g., drawing buffers 302*b*, 304*b*) to be used as "front" drawing buffers for providing source tile data from the various applications. The desktop compositor can issue conventional copy commands to copy tile data from one of the front drawing buffers to the back desktop buffer as well as conventional write commands to write new tile data to the back desktop buffer. The graphics memory interfaces executes the copy commands according to process 400 and the write commands according to process 500, returning any appropriate signals to the desktop compositor. Accordingly, the present invention is suitable for use with a wide variety of desktop compositor implementations.

Examples of techniques for allocation and deallocation of tile table entries and tile memory locations will now be described. In one embodiment, the tile memory 218 is a dedicated area in the graphics memory (or system memory) large enough to store data for a predetermined number (M) of tiles, and the tile table 314 is a register array with sufficient capacity to store a reference (mem_loc) to a memory location and a counter (ref_cnt) for each of the M tiles. The location reference mem_loc for each tile table entry can be a constant value identifying a unique location in the tile memory; that is, for each tile location in the tile memory, there is a corresponding tile table entry that references that location. For instance, the first entry in the tile table 314 can be assigned to tile location 0, the second tile table entry to tile location 1, and so on. At system initialization, all of the tile table entries have their reference counters ref_cnt set to zero, indicating that no buffers are currently associated with tile locations. When a tile memory location is to be allocated, the tile table is searched to find an entry with reference counter ref_cnt=0; any such entry is not currently in use and may be allocated to a new use.

When an application starts, it is allocated a pair of drawing buffers (e.g., 302*a*, 302*b*) in the memory interface 222. The allocated buffers can be initialized by identifying entries in tile table 314 that have reference count values of zero (i.e., the corresponding tile memory locations are not in use) and modifying each tile of the allocated buffers to reference such a tile table entry. Each time a buffer tile is assigned to a tile table entry, the reference count for that entry is incremented. While it is straightforward to initialize each tile of the buffers to reference a different tile table entry, this is not required; the copy-on-write processes 400 and 500 described above deal properly with any tile table entries that are shared between two or more tiles.

During execution of an application, any time an unused tile location is needed for either the application drawing buffer or the desktop buffer, the tile table is searched to identify an entry with a reference count value of zero, signifying an unused tile location. If the number of tile locations in the tile memory 218 is large enough to allow each tile of each logical buffer 300 to be associated with a different tile location, an unused location will be available whenever one is needed.

When the application exits, its drawing buffers 302*a*, 302*b* are reset to an unused state. In one embodiment of a reset process, for each tile in each drawing buffer, the reference count of the corresponding tile table entry is decremented. At that point, the pair of drawing buffers 302*a*, 302*b* are marked as available for use by another application.

In this embodiment, each tile table entry can be permanently associated with a corresponding tile memory location. Accordingly, it is not necessary to store references to tile memory locations in the tile table entries. Instead, the logical buffers can store an offset value for each tile, with the offset value serving both as a reference to a tile memory location and as a reference to a tile table entry (i.e., a counter).

In another embodiment, tile memory locations and tile table entries are dynamically allocated and deallocated. When an application starts, a number of tile memory locations are allocated from a pool of free memory. The number is advantageously made equal to the twice the maximum number of tiles that the application writes for a frame. A tile table entry is created for each of the newly allocated tile memory locations, and logical buffers for the application are initialized to reference the new tile table entries. In addition, while an application is running, if a new tile memory location is needed and none is available, a new location can be dynamically allocated. When the application ends, the reference count for each tile table entry referenced by its logical buffers is decremented, and the logical buffers are made available for use by another application.

In this embodiment, garbage collection is advantageously performed from time to time to deallocate tile locations that are no longer in use. The garbage collection process involves identifying tile table entries for which the reference count is zero (i.e., the referenced tile locations are not in use) and returning the corresponding tile memory locations to the pool of free memory. Maintaining a free memory pool can be implemented using various techniques, a number of which are known in the art. The tile table entry can then be reset to an "uninitialized" value, indicating that the tile table entry is free to be reused the next time a new tile table entry (or tile memory location) is needed It will be appreciated that these memory management techniques are illustrative and that other techniques for allocating and deallocating tile memory locations can also be implemented.

Figure 6:
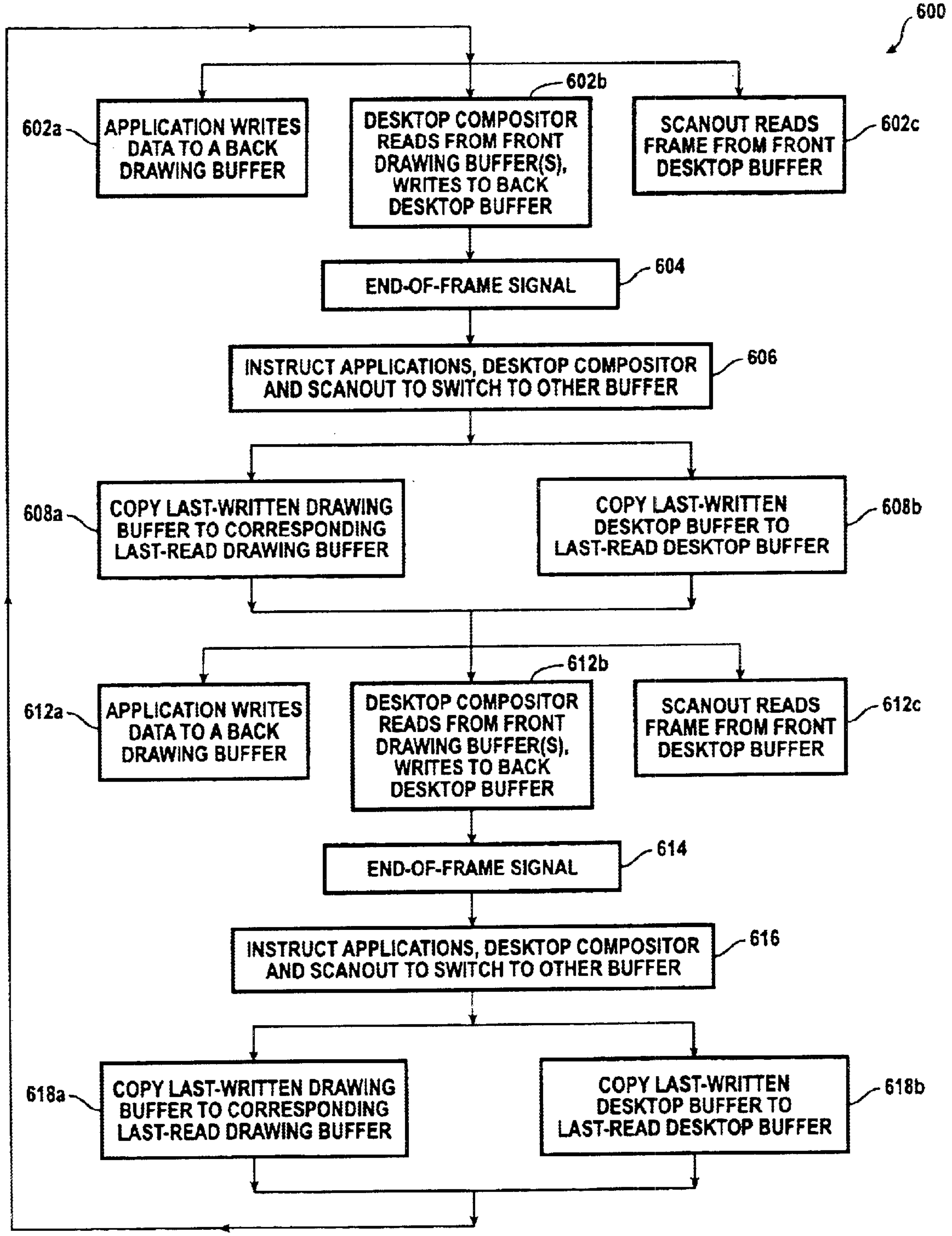
FIG. 6 is a flow chart of a process for operating an image-generating system with a desktop compositor according to an embodiment of the present invention.

FIG. 6 illustrates a process for using the memory system of FIG. 3 to provide a desktop compositor system that employs copy-on-write semantics to reduce the memory bandwidth required. In this process, each application writes tile data using a respective "back" drawing buffer (e.g., buffers 302*a*, 304*a*). In parallel, the desktop compositor builds an image by reading from "front" drawing buffers (e.g., buffers 302*b*, 304*b*) and writing to a "back" desktop buffer (e.g., buffer 306*a*), and the scanout control logic generates a display image by reading from a "front" desktop buffer (e.g., buffer 306*b*).

More specifically, at step 602*a*, an application (e.g., application X) executing on the CPU writes tile data to its drawing buffer 302*a* using process 500. Other applications (e.g., application Y) may be executing in parallel and writing tile data to their respective drawing buffers (e.g., buffer 304*a*) using process 500. In parallel, at step 602*b*, the desktop compositor module builds a desktop image in back desktop buffer 306*a*. This process involves reading and in some instances copying tile data from the front drawing buffers (buffers 302*b*, 304*b*) that are not being used for writing by the applications. Examples of processes for building a desktop image will be described further below with reference to FIG. 7. Also in parallel, at step 602*c*, scanout control logic reads front desktop buffer 306*b* and causes an image to be displayed on the display device.

At step 604, an end of frame (EOF) signal is generated. In one embodiment, the EOF signal is generated when the scanout control logic has finished scanning out the current frame from the front desktop buffer 306*b* and is ready for a new frame. In another embodiment, in order to prevent undesirable artifacts in displayed images, the EOF signal is generated when scanout of the current frame is complete and a consistent set of updates has been delivered to the various back buffers for the next frame. Generation of such signals can be done using techniques similar to those in conventional double-buffered pipelines.

In response to the EOF signal, at step 606, the applications, the desktop compositor, and the scanout control logic are each instructed to switch front and back buffers. At step 608*a*, the newly written drawing buffers 302*a*, 304*a* are copied to the newly read drawing buffers 302*b*, 304*b*, respectively, in accordance with process 400. At step 608*b*, the newly written desktop buffer 306*a* is copied to the scanned-out desktop buffer 306*b*, in accordance with process 400.

At step 612*a*, applications begin writing data to back drawing buffers 302*b*, 304*b*, while at step 612*b*, the desktop compositor reads from front drawing buffers 302*a*, 304*a* and builds a desktop image in back desktop buffer 306*b*, and at step 612*c*, scanout control logic reads the front desktop buffer 306*a* and causes an image to be displayed on the display device.

At step 614, another EOF signal is generated; this step can be implemented similarly to step 604. In response, at step 616, the applications, the desktop compositor, and the scanout control logic are each instructed to switch front and back buffers again. At step 618*a*, the newly written drawing buffers 302*b*, 304*b* are copied to newly read drawing buffers 302*a*, 304*a*, respectively, in accordance with process 400; at step 618*b*, the newly written desktop buffer 306*b* is copied to the scanned-out desktop buffer 306*a* in accordance with process 400. At this point, the process returns to steps 602*a,b,c*, and process 600 continues for as long as tile data is being displayed.

It should be noted that in process 600, data for a tile is moved from one tile location to another only when new tile data is written to one of the buffers. In some embodiments, only a few pixels change during a typical frame interval;

thus, the number of tiles for which data is copied can be small, and memory bandwidth can be substantially reduced as compared to conventional double-buffered frame buffers. In addition, the buffer-copying steps 608*a,b* and 618*a,b* involve modifying only tile table references (or other tile location associations) of the buffer tiles and do not require copying any tile data. Since a tile table reference can be substantially smaller than the data for a tile, these steps can be performed with little or no memory access.

It should also be noted that the copy-on-write semantics used in process 600 can be transparent to the applications, the desktop compositor, and the scanout control logic. As described above with respect to processes 40 and 500, an application can issue write commands targeting a logical buffer reference provided by the graphics memory interface; the graphics memory interface executes the write command according to process 500 and returns any appropriate signals to the application.

It will be appreciated that process 600 is illustrative and that variations and modifications are possible. For instance, at the end of steps 608*a,b* (and steps 618*a,b*), drawing buffers 302*a*, 302*b* refer to the same tile memory locations, and desktop buffers 306*a*, 306*b* refer to the same tile memory locations. Thus, it is also possible to implement process 600 such that an application always writes to the same one of its drawing buffers (e.g., buffer 302*a*) and the desktop compositor always reads from the other one of these drawing buffers (e.g., buffer 302*b*), and similarly for the two desktop buffers. It is also not required that copying of desktop buffers (steps 608*b*, 618*b*) and drawing buffers (steps 608*a*, 618*a*) be performed concurrently, or that either copy operation be completed in the interval between frames (e.g., during a vertical retrace operation of a display device), although such an implementation can reduce tearing and other visual artifacts. Further, swapping of front and back drawing buffers for an application can also be controlled by the application and is not required to occur at the end of a frame or at the end of every frame.

As another example, copying of the drawing buffer for an application (steps 608*a*, 618*a*) can be performed or not, as appropriate for that application. For example, copying is advantageously performed if the application incrementally updates its drawing buffer. Many applications, however, redraw their entire drawing buffers during each frame rather than relying on incremental updating. For such applications, copying the drawing buffer (steps 608*a*, 618*a*) may advantageously be omitted. In some embodiments, the decision to copy a drawing buffer or not can be made in an application-specific manner. For instance, a "copy" flag can be provided for each pair of drawing buffers and set to an appropriate value based on whether the application to which the pair of buffers is allocated performs incremental updating. The copy flag for each drawing buffer pair is used to control whether copying is performed for that pair at steps 608*a*, 618*a*.

Figure 7:
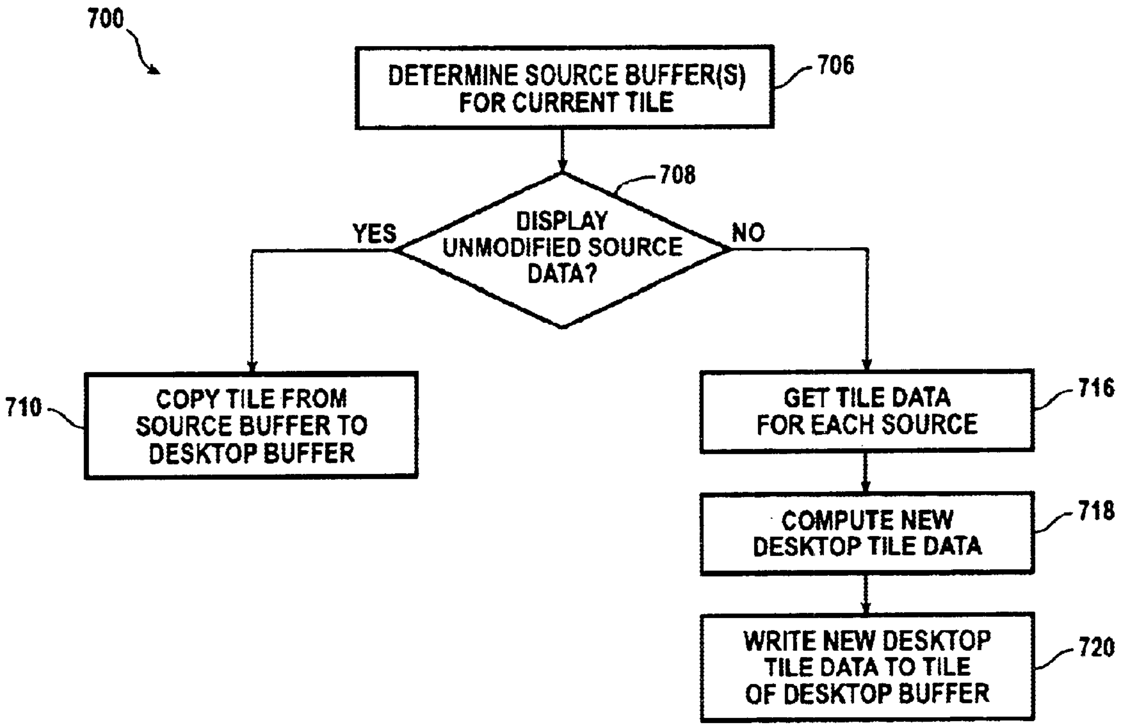
FIG. 7 is a flow chart of a process for generating a composite desktop image according to an embodiment of the present invention.

FIG. 7 illustrates a process 700 for generating a tile of a desktop image that can be used in step 602*b* (or step 612*b*) for each tile of the desktop. According to process 700, for a given tile, either existing data in one of the source buffers (e.g., a tile of an application's front buffer) is used directly or new data is generated by combining data from multiple sources or modifying data from a single source. If existing data is to be used directly, the tile of the source buffer is copied to the appropriate tile of the desktop buffer according to process 400, i.e., by copying the tile table reference from the source buffer tile to the desktop frame buffer tile. If new data is generated, the new data is written according to process 500, i.e., by first ensuring that the tile location associated with the desktop frame buffer tile is not associated with any other buffer tile, then writing to the tile location associated with the desktop frame buffer.

At step 706, the desktop compositor determines which source buffer (or buffers) is to be used for a current tile. This step can be implemented in various ways. For instance, the desktop compositor may receive information from an operating system about the position, size, and priority of the windows for each application and use that information to determine which application's window is visible at the current tile location. The desktop compositor may also receive control signals from the operating system identifying a specific source (or sources) to be used for each tile.

It should be noted that the desktop compositor module is not limited to using tile data from corresponding tiles in a drawing buffer; that is, the data source for a tile i of the desktop can be any tile j from any application's drawing buffer. For instance, in some embodiments, an application always stores tile data starting in the first tile of its drawing buffer, regardless of where the application's window is to be positioned on the display. The desktop compositor module is provided with information about the window position for each application and uses that information to select an appropriate source tile for a particular tile of the desktop.

At step 708, it is determined whether existing tile data is to be used directly in the display frame or whether manipulation of the existing data is needed. Any kind of manipulation can be implemented. For instance, the desktop compositor can alpha-blend tile data from two (or more) applications to create effects such as transparent or translucent windows, or to create transitional effects such as a "dissolve." The desktop compositor can also modify tile data for a single application (e.g., by changing the brightness level) to produce visual effects such as fade-in or fade-out. Other ways of manipulating tile data from one or more sources to generate a composite image can also be implemented, and embodiments of the present invention allow for any such manipulation.

At step 710, if existing data is to be used directly in the display frame, the source tile is copied from the source buffer (e.g., buffer 302*b*) to the desktop frame buffer (e.g., buffer 306*a*). Copying process 400 is advantageously used at step 710 so that only a tile table reference is copied, thereby reducing memory bandwidth.

If, at step 708, it is determined that data manipulation is needed, then the desktop compositor reads the tile data for each source from the appropriate buffer (step 716) and computes the new data by performing appropriate manipulations (step 718). As described above, any desired manipulation can be performed. At step 720, the new data is then written to a tile associated with the desktop frame buffer (e.g., buffer 306*a*), in accordance with writing process 500.

It will be appreciated that process 700 is illustrative and that variations and modifications are possible. For instance, in one alternative embodiment, the desktop compositor always writes new tile data rather than using process 400 to copy a tile of a source buffer. In addition, computing desktop tile data at step 718 can be done in any desired manner, including any desired operations, e.g., blending tile data from two or more sources, resealing tile data according to a scaling factor, and so on. Process 700 can be performed for each tile of the display screen, and tiles can be processed sequentially or in parallel.

As described above, embodiments of the present invention provide systems and methods for managing buffers in a display pipeline (e.g., a desktop compositor pipeline) using copy-on-write semantics. Transferring of the tile data between memory locations is reduced to the extent that there are tiles that are not modified during a frame interval. In addition, copying buffers at the end of a frame does not require transferring large amounts of tile data. Instead, only tile location associations (e.g., references to tile table entries) of each tile are modified. The tile location association is advantageously much smaller than the tile data, so that demand for memory bandwidth between frames (e.g., during vertical retrace) can be substantially reduced. Transferring of tile data between memory locations occurs only to the extent that data is actually modified.

For instance, in one embodiment, each tile includes 16 pixels, with 32 bits of data per pixel, and the tile table entries are implemented as 32-bit words, with 28 bits providing the memory location reference and 4 bits for the counter. A conventional copy operation requires moving 16*32 bits of data per tile; copying according to process 400 requires updating, at most, 64 bits (two tile table entries). Writing new tile data according to process 500 introduces an additional overhead of 32 bits as compared to conventional processes, due to modifying the tile table entries (32 bits). Thus, in this embodiment, a net reduction in memory bandwidth by about a factor of five can be obtained this embodiment. In addition, the peak memory bandwidth at end of frame can be reduced by a larger factor.

While the invention has been described with respect to specific embodiments, one skilled in the art will recognize that numerous modifications are possible. The display pipeline formed by the various buffers can have an arbitrary depth and any maximum reference count desired. The memory interface is not limited to the configuration of logical buffers and tile table entries described herein; any implementation can be used, so long as a buffer referenced by an application, desktop compositor, or scanout process can be unambiguously mapped to a tile memory location and so long as it can be determined whether or not a given tile memory location can be overwritten without affecting other buffers.

The number of tiles and/or the number of pixels per tile can be selected as desired. In an implementation with fewer pixels per tile, tile updates for a particular tile may be less frequent, but the size of the tile table may be increased. In addition, small tile sizes could lead to inefficient use of memory bandwidth, e.g., if the tile size is smaller than the amount of pixel data that can be transferred in a single read or write command. Assigning the same number and arrangement of pixels to each tile can simplify the implementation but is not required. In embodiments where a graphics processing system implements tile-based rendering, a tile size corresponding to the size of a rendering tile may be chosen, but other tile sizes can also be used, and the present invention does not require the use of tile-based rendering.

The drawing buffers for a given application are not required to include enough tiles to cover the entire screen, nor are buffers for different applications required to have the same number of tiles. In addition, the application buffers are not limited to being filled by data from an application program executing on a CPU or from a rendering engine (e.g., in a graphics processing unit); other sources of tile data can also be used, such as video playback, a static screen background image, images generated by an operating system (e.g., taskbars and desktop icons), etc. It is also to be understood that two or more applications and/or other tile data sources can share a pair of drawing buffers if desired.

As described above, the present invention can be implemented regardless of whether application drawing buffers are incrementally updated or rewritten during a frame, and the management of drawing buffers can be controlled on an application-by-application basis. Moreover, one skilled in the art will recognize that a single-buffered application drawing buffer can also be implemented, with writing and reading operations concurrently referencing the same drawing buffer. Where multiple applications have different drawing buffers, one application may have a single-buffered drawing buffer, while a second application has a double-buffered drawing buffer that is incrementally updated and a third has a double-buffered drawing buffer that is rewritten during each frame. Any combination of drawing buffer management schemes can be implemented.

Thus, although the invention has been described with respect to specific embodiments, it will be appreciated that the invention is intended to cover all modifications and equivalents within the scope of the following claims.

What is claimed is:

1. A system for managing tile data for a plurality of tiles of a display, comprising:

a memory space configured to store tile data in a plurality of tile memory locations;

a plurality of buffers, each having a plurality of buffer tiles, wherein each buffer tile stores a reference associating the buffer tile with one of the tile memory locations and wherein corresponding buffer tiles in different ones of the plurality of buffers are associable with the same one or different ones of the tile memory locations; and a memory interface circuit configured to receive a memory access command referencing a buffer tile of one of the plurality of buffers and to respond to the memory access command by accessing the tile memory location associated with the buffer tile, wherein the memory interface circuit uses the references stored in the buffer tiles to modify associations of the buffer tiles with the tile memory locations.

2. The system of claim 1 wherein the memory interface circuit is further configured to respond to a command to read data from a source buffer tile of one of the plurality of buffers by accessing the tile memory location associated with the source buffer tile.

3. The system of claim 1 wherein the memory interface circuit is further configured to respond to a command to copy data from a source buffer tile of a first one of the plurality of buffers to a destination buffer tile of a second one of the plurality of buffers by associating the destination buffer tile with a same one of the tile memory locations as the source buffer tile.

4. The system of claim 1 wherein the memory interface circuit is further configured to respond to a command to write data to a target buffer tile of one of the plurality of buffers by ensuring that the tile memory location associated with the target buffer tile is not associated with any other buffer tile of any of the buffers and then writing the data to the tile memory location referenced by the target buffer tile.

5. The system of claim 1, further comprising:

a plurality of counters, each counter associated with a respective one of the tile memory locations and configured to store a value representing the number of buffer tiles that are associated with the respective one of the tile memory locations, wherein the memory interface circuit uses the counters to detect a need for modifying associations of the buffer tiles with the tile memory locations.

6. The system of claim 1 further comprising:

a tile table comprising a plurality of entries, each tile table entry including a reference to a respective one of the plurality of tile memory locations, wherein each buffer tile is associated with one of the tile memory locations by storing in the buffer a reference to the corresponding tile table entry.

7. The system of claim 6 wherein each tile table entry further includes a counter that is associated with the respective one of the plurality of tile memory locations, the counter being configured to store a value representing the number of buffer tiles that are associated with the respective one of the tile memory locations, wherein the memory interface circuit uses the respective counters of the tile table entries to detect a need for modifying associations of the buffer tiles with the tile memory locations.

8. The system of claim 6 wherein the tile memory location reference stored in each tile table entry includes a pointer to a location in a memory device.

9. The system of claim 6 wherein the tile memory location reference stored in each tile table entry includes an offset value that maps to a location in a memory device.

10. The system of claim 6 wherein the tile memory location reference stored in each tile table entry has a static value.

11. The system of claim 6 wherein tile table memory location references stored in tile table entries are dynamically updated.

12. The system of claim 6 wherein the memory interface circuit is implemented on a chip and the tile table and buffers are implemented on the same chip.

13. The system of claim 1 wherein the tile memory space is located in one or more random access memory (RAM) arrays.

14. The system of claim 1 wherein the plurality of buffers includes: a first drawing buffer and a second drawing buffer for tile data generated by an application; and a first desktop buffer and a second desktop buffer for tile data to be displayed.

15. The system of claim 14, further comprising:

a desktop compositor module configured to generate desktop tile data for a first tile by issuing a read command to the memory interface, the read command referencing a first tile of the first drawing buffer, generating desktop tile data from the source tile data, and storing the desktop tile data via the memory interface by issuing a write command that references a first tile of the first desktop buffer.

16. The system of claim 15 wherein the desktop compositor module is further configured to generate desktop tile data for a second tile by selecting a second tile of the first drawing buffer as a data source and copying the selected tile to a second tile of the first desktop buffer via the memory interface.

17. The system of claim 15, further comprising:

scanout control logic configured to read display data via the memory interface by issuing a read command that references a tile of the second desktop buffer and to generate display control signals in response to the display data.

18. The system of claim 15 wherein source tile data is written via the memory interface in response to a write command issued by an application program, the write command referencing a tile of the second drawing buffer.

19. A method for managing data for a plurality of tiles of a display, the method comprising:

providing a plurality of buffers, each including a plurality of buffer tiles, each buffer tile being associated with one of a plurality of tile memory locations in a tile memory space, wherein the tile memory space is accessed by referencing one of the buffer tiles;

for each of the tile memory locations, maintaining a reference count of the buffer tiles associated with the tile memory location;

copying a source buffer tile of a first one of the buffers to a destination buffer tile of a second one of the buffers by associating the destination buffer tile with a same tile memory location as the source buffer tile and updating the reference counts; and writing new data for the destination buffer tile to the tile memory location associated with the destination buffer tile after updating the destination buffer tile such that the tile memory location associated with the destination buffer tile is not associated with any other buffer tile.

20. The method of claim 19 wherein the act of copying a source buffer tile includes:

determining whether the destination buffer tile is associated with a first tile memory location associated with the source buffer tile or with a second tile memory location different from the first tile memory location; and in response to determining that the destination buffer tile is associated with the second tile memory location:

modifying the association of the destination buffer tile such that the destination buffer tile is associated with the first tile memory location;

incrementing a first reference count for the first tile memory location; and decrementing a second reference count for the second tile memory location.

21. The method of claim 19, wherein the act of writing new data for the destination buffer tile includes:

reading tile data from a tile memory location associated with the destination buffer tile;

updating the tile data with the new data;

determining from the reference counts whether a first tile memory location associated with the destination buffer tile is also associated with another buffer tile; and in response to determining that the first tile memory location is also associated with another buffer tile:

identifying a second tile memory location that is not associated with any buffer tile;

modifying the association of the destination buffer tile such that the destination buffer tile is associated with the second tile memory location;

decrementing a first reference count for the first tile memory location; and incrementing a second reference count for the second tile memory location.

22. The method of claim 21 wherein the act of identifying a second tile memory location includes:

identifying a tile memory location for which the reference count is zero.

23. The method of claim 21 wherein the act of identifying a second tile memory location includes:

identifying an unallocated tile memory location in the tile memory space; and allocating The unallocated tile memory location as the second tile memory location.

24. The method of claim 19, further comprising:

providing a tile table having a plurality of entries, each tile table entry referencing a respective one of the tile memory locations; and associating each buffer tile with one of the tile table entries, thereby associating each buffer tile with one of the tile memory locations.

25. The method of claim 24 wherein the act of maintaining a reference count of the number of buffer tiles associated with the tile memory location includes:

providing a counter in each of the tile table entries, the counter storing a counter value.

26. The method of claim 25 wherein the act of copying a source buffer tile includes:

determining whether the destination buffer tile is associated with a first tile table entry associated with the source buffer tile or with a second tile table entry other than the first tile table entry; and in response to determining that the destination buffer tile is associated with the second tile table entry:

modifying the association of the destination buffer tile such that the destination buffer tile is associated with the first tile table entry;

incrementing the counter of the first tile table entry; and decrementing the counter of the second tile table entry.

27. The method of claim 19, wherein the plurality of buffers includes:

a pair of drawing buffers for tile data generated by an application; and a pair of desktop buffers for tile data to be displayed.

28. A method for managing data for a plurality of tiles of a display, the method comprising:

providing a plurality of buffers, each including a plurality of buffer tiles, each buffer tile being associated with one of a plurality of tile memory locations in a tile memory space, wherein the tile memory space is accessed by referencing one of the buffer tiles, the plurality of buffers including a first drawing buffer, a second drawing buffer, a first desktop buffer, and a second desktop buffer;

for each tile memory location, maintaining a reference count of the buffer tiles associated with the tile memory location;

scanning out a first display image by reading tile data from tile memory locations associated with buffer tiles of the first desktop buffer;

in parallel with the act of scanning out a first display image:

generating desktop tile data for a tile of a second display image from source tile data stored in a tile memory location associated with a buffer tile of the first drawing buffer; and storing the desktop tile data in a tile memory location associated with a buffer tile of the second desktop buffer; and in response to completion of the act of scanning out a first display image, copying the second desktop buffer to the first desktop buffer by associating each buffer tile of the second desktop buffer with a same tile memory location as a corresponding buffer tile of the first desktop buffer and updating the reference counts.

29. The method of claim 28 wherein the act of storing the desktop tile data includes:

writing the desktop tile data to a tile memory location associated with a tile of the second desktop buffer after updating the tile of the second desktop buffer such that the tile memory location associated with the tile of the second desktop buffer is not associated with any other buffer tile.

30. The method of claim 28 wherein the act of generating desktop tile data for a tile includes determining whether the source tile data is to be used without modification as the desktop tile data.

31. The method of claim 30, wherein the act of storing the desktop tile data includes:

in response to determining that the source tile data is to be used without modification, copying a tile of the first drawing buffer to the second desktop buffer by associating the tile of the second desktop buffer with a same tile memory location as a corresponding tile of the first drawing buffer and updating the reference counts; and in response to determining that unmodified source tile data is not to be used as the desktop tile data:

modifying the source tile data; and writing the modified tile data to a tile memory location associated with a tile of the second desktop buffer after updating the tile of the second desktop buffer such that the tile memory location associated with the tile of the second desktop buffer is not associated with any other buffer tile.

32. The method of claim 28, further comprising:

in parallel with the act of scanning out a first display image, writing source tile data for a third display image to a tile memory location associated with a buffer tile of the second drawing buffer after updating the buffer tile of the second drawing buffer such that the tile memory location associated with the buffer tile of the second drawing buffer is not associated with any other buffer tile.

33. The method of claim 32, further comprising:

in response to completion of the act of scanning out a first display image, copying the second drawing buffer to the first drawing buffer by associating each buffer tile of the second drawing buffer with a same tile memory location as a corresponding buffer tile of the first drawing buffer and updating the reference counts.

* * * * *